E. J. SWEDLUND.
SWIVEL.
APPLICATION FILED SEPT. 27, 1915.

1,200,540. Patented Oct. 10, 1916.

Inventor
Erick J. Swedlund,
By E. H. Bond
Attorney

UNITED STATES PATENT OFFICE.

ERICK J. SWEDLUND, OF WILLISTON, NORTH DAKOTA.

SWIVEL.

1,200,540.      Specification of Letters Patent.      Patented Oct. 10, 1916.

Application filed September 27, 1915. Serial No. 52,876.

*To all whom it may concern:*

Be it known that I, ERICK J. SWEDLUND, a citizen of the United States, residing at Williston, in the county of Williams and State of North Dakota, have invented certain new and useful Improvements in Swivels, of which the following is a specification.

This invention relates to certain new and useful improvements in swivels designed for use primarily upon watch chains but applicable to other uses.

The present invention has for its objects among others to provide a simplified form of swivel composed of few parts, those easily assembled, efficient in use and in which provision is made against separation of the parts.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1:
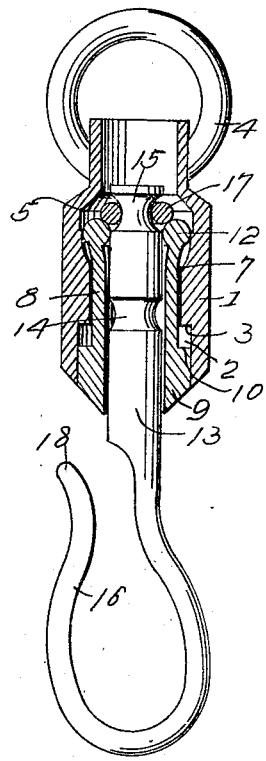
Figure 2:
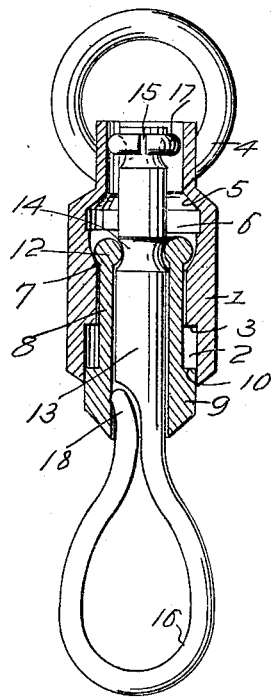
Figure 3:
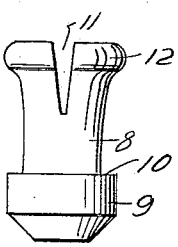

Figure 1 is a substantially central longitudinal section through my improved swivel with the loop portion open. Fig. 2 is a similar view showing the loop portion closed. Fig. 3 is an elevation of the sleeve removed.

Like numerals of reference indicate like parts throughout the several views.

Referring to the drawings, 1 designates the outer shell open at the ends, as shown, and having near one end an enlarged bore 2 forming a shoulder 3 within the shell.

4 is a ring soldered or otherwise affixed to the end of the shell, which end is reduced in diameter forming the inclined shoulder 5, the chamber 6 and the lower shoulder 7, all as seen clearly in Figs. 1 and 2. Within this shell is mounted to slide longitudinally thereof a sleeve 8 having at one end the annular enlargement 9 forming a shoulder 10 adapted for coöperation with the shoulder 3 of the outer casing. The other end of this sleeve is longitudinally slitted, as seen at 11, and provided with an annular bead or the like 12 substantially circular in cross section, as shown.

13 is the locking member. It comprises a shank extending longitudinally through the sleeve 8 and into the reduced upper portion of the shell, the same being formed with an annular groove 14 between its ends and an annular groove 15 at its outer end. The locking member terminates in a hook 16 and is formed of metal having sufficient spring to allow it to open slightly when released, as seen in Fig. 1. When in locked position, the end of this spring portion is received within the adjacent end of the sleeve.

Placed around and seated in the groove 15 of the stem of the locking member is a split ring 17 of any suitable material which, by reason of its engagement with the annular bead 12 of the sleeve 8, as seen in Fig. 1, serves to prevent withdrawal of the locking member and its hook when the hook is open, as will be clearly understood upon reference to Fig. 1.

When the hook is open, the parts are in the position in which they are shown in Fig. 1. When it is desired to close the hook, the resilient end 18 of the hook 16 is pressed inward into the position in which it is shown in Fig. 2. As the locking member 13 is forced inward, the split end of the sleeve yields until the groove 14 thereof is coincident with the bead 12 of the sleeve, when the latter springs into said groove and the parts are thus locked. The bead 12, working in the concavity at the shoulder 7, permits of easy turning of the sleeve or of the locking member and its loop.

Modifications in detail may be resorted to without departing from the spirit of the invention or sacrificing any of its advantages.

What is claimed as new is:—

1. A swivel embodying a casing, a sleeve longitudinally movable therein, and a locking member having a projecting hook and longitudinally movable within the sleeve and having means coöperating with one end of the latter to lock the parts in position, said hook being open in one position of said sleeve and closed in the other position thereof.

2. In a swivel, a casing, a sleeve slidable within the same, a locking member slidable within the sleeve and having a hook projecting beyond said casing and coöperating means for holding the sleeve and locking member in adjusted position, said hook being open in one position of said sleeve and closed in the other position thereof.

3. In a swivel, a casing, a sleeve slidable within the same, a locking member slidable within the sleeve and having a hook projecting beyond said casing, coöperating means for holding the sleeve and locking member in adjusted position, said hook being open in one position of said sleeve and closed in the other position thereof, and means for preventing withdrawal of the locking member when the swivel is open.

4. A swivel comprising a casing, a sleeve slidable therein, and a locking member slidable within the sleeve and movable therewith for locking and unlocking movements, and having a hook with a resilient terminal engageable within the sleeve, said hook being open in one position of said sleeve and closed in the other position thereof.

5. A swivel comprising a casing, a sleeve slidable therein, and a locking member slidable within the sleeve and movable therewith for locking and unlocking movements and having a hook with a resilient terminal engageable within the sleeve, said sleeve and locking member formed with coöperating means to permit rotation of the locking member and yet prevent its withdrawal from the sleeve and said hook being open in one position of said sleeve and closed in the other position thereof.

6. A swivel comprising a casing, a sleeve slidable therein and a locking member having an annular groove receiving the inner end of the sleeve, said locking member formed with a hook having a spring point receivable within said sleeve.

7. A swivel comprising a casing, a sleeve slidable therein, a locking member having an annular groove receiving the inner end of the sleeve, said locking member formed with a hook having a spring point receivable within said sleeve, said locking member having a groove near its inner end, and means retained within said groove and engageable with the adjacent end of the sleeve to prevent withdrawal of the locking member when the swivel is open.

8. A swivel comprising a casing, a sleeve longitudinally movable therein and having one end expansible and provided with a bead and a locking member having a projecting hook open in one position of said sleeve and closed in the other position thereof, said locking member being slidable within the sleeve and movable therewith for locking and unlocking movements and having an annular groove to receive said bead.

9. A swivel comprising a casing, a sleeve longitudinally movable therein and having one end expansible and provided with a bead, and a locking member slidable within the sleeve and having an annular groove to receive said bead, said locking member terminating in a hook having a resilient point engageable within the sleeve.

10. A swivel comprising a casing, a sleeve longitudinally movable therein and having one end expansible and provided with a bead, and a locking member slidable within the sleeve and having an annular groove to receive said bead, said locking member terminating in a hook having a resilient point engageable within the sleeve, said locking member having an annular groove at its inner end, and means retained within said groove and engageable with the adjacent end of the sleeve to prevent withdrawal of the locking member when the swivel is open.

11. In a swivel, a casing, a sleeve slidable therein, a locking member slidable within the sleeve and movable therewith for locking and unlocking movements, and means extending outside of said casing for sliding said sleeve within the casing, the outer end of said means being received within said sleeve in one position of the latter.

In testimony whereof I affix my signature in presence of two witnesses.

ERICK J. SWEDLUND.

Witness:
S. M. HYDLE.

Copies of this patent may be obtained for five cents each, by addressing the "Commissioner of Patents, Washington, D. C."